United States Patent Office 3,058,838
Patented Oct. 16, 1962

3,058,838
PIGMENTS
John Kenneth Olby, Surbiton, England, assignor to Associated Lead Manufacturers Limited, London, England, a British company
No Drawing. Filed Apr. 24, 1961, Ser. No. 104,775
Claims priority, application Great Britain May 24, 1960
16 Claims. (Cl. 106—299)

This invention relates to vanadium-zirconium stains for use in the production of glazes for ceramics of the type comprising a calcined mixture of zirconia, silica, sodium fluoride (or other alkali metal halide) and ammonium vanadate (or other source of vanadium pentoxide), the calcined product consisting essentially of zirconium silicate with vanadium present in the crystal lattice. Such stains have a turquoise blue colour and contain 100 parts by weight of zirconium oxide, 48.8–50 parts by weight of silica, 3–15 parts by weight of ammonium vanadate and 1.8–9 parts by weight of sodium fluoride. The amount of silica present must be at least sufficient to combine with substantially all of the zirconia, the amount of sodium fluoride (which acts as a catalyst to promote the formation of zirconium silicate) must be sufficient to ensure virtuallly complete combination of the zirconia, the optimum quantity being about 3.6% of the weight of the zirconia, and the optimum amount of ammonium vanadate (or the equivalent in other vanadium compounds) is 6.09% of the weight of the zirconia. The presence of less ammonium vanadate than this weakens the colour, and the presence of more vanadium strengthens the colour, provided there is a pro rata increase in the amount of sodium fluoride, but at the expense of a consumption of vanadium disproportionate to the increased strength of the colour.

A typical example of the production of such a blue stain is as follows:

10 grammes of zirconium oxide were shaken with a master mix consisting of an intimate mixture of 4.96 grammes silica, 0.36 gramme sodium fluoride and 0.609 gramme of ammonium vanadate, and the product heated up to 950° C. over a period of 3 hours and maintained at this temperature for 1 hour. This yielded a pigment of turquoise blue colour.

The present invention is based on my discovery that the colour of such vanadium-zirconium stains can be modified by the incorporation of small amounts of certain other elements in the zirconium silicate crystal lattice.

The invention provides a vanadium-zirconium stain of the above type containing in the zirconium silicate crystal lattice, as a colour modifier, 0.1–1% phosphorus; or 0.1–2% arsenic; or 0.5–25% bismuth; or 0.5–15% bismuth and either 0.1–3% yttrium or 0.2–6% lanthanum or 0.2–6% neodymium; or 0.1–2% manganese; all percentages being percentages by weight of the zirconium oxide in the stain.

Phosphorus and arsenic are incorporated in the mixture to be calcined as water soluble oxyacids or their water soluble salts, while bismuth, yttrium, lanthanum, neodymium and manganese are incorporated as oxides or as compounds which will yield oxides on heating. Thus manganese may be incorporated as a manganous compound which will yield an oxide of manganese on heating.

Incorporation of phosphorus or arsenic in the stain yields stains of a distinctive and pleasing mauve colour. The compound of phosphorus or arsenic may either be added to the master mix, i.e. to the mixture which is to be heated with the zirconia to form the stain, or it may be incorporated in the zirconia during the process of recovery of the latter from the zirconium ore. Thus the compound of phosphorus or arsenic may be added to a solution of zirconyl chloride obtained by sintering zircon ore with sodium carbonate and extracting the resulting sinter cake with hydrochloric acid.

The colour produced in the stain depends on the proportion of phosphorus or arsenic, which should preferably be 0.2–0.3% by weight of the zirconia present in the case of phosphorus and 0.4–0.6% in the case of arsenic. With smaller amounts the colour approximates more closely to the turquoise of the known unmodified stain, the smaller the amount of the addition. Above the limits quoted, the addition of more phosphorus or arsenic results in a loss of strength of the colour, which becomes noticeably paler at about 0.5% phosphorus or about 1% arsenic. If mixtures of arsenic and phosphorus are used, the effect on the colour is similar, provided due allowance is made for the fact that 1 part of phosphorus is equivalent to 2½ parts of the arsenic.

The following are examples of the preparation of stains containing phosphorus and arsenic:

(1) *Addition of Phosphorus to the Master Mix*

A master mix was made by kneading together 4.96 grammes silica, 0.3 gramme sodium fluoride, 0.609 gramme ammonium metavanadate and 0.5 ml. of an aqueous solution of phosphoric acid containing 0.063 gramme of $H_3PO_4$. The mixture was dried at 100° C., again reduced to a powder and mixed by gently shaking with 10 grammes of zirconium oxide. The amount of phosphorus so incorporated was 0.2% by weight of the zirconia. On heating to 950° C. as described above for the preparation of the turquoise blue, a pigment was obtained having a pleasing and distinctive mauve colour.

(2) *Incorporation of Phosphorus in the Zirconia*

To 400 mls. of zirconium oxychloride solution containing the equivalent of 100 grammes of zirconium oxide per litre were added 10.4 mls. sulphuric acid (D 1.84) and the solution brought to boiling. A solution of 0.55 g. of anhydrous sodium phosphate in 150 mls. water was added to the boiling solution at a uniform rate over a period of 20 minutes, and boiling continued for a further 40 minutes, during which water was added at a uniform rate until the total volume of liquid was 800 mls. The precipitate was allowed to stand in contact with the mother liquor for 2 hours, then decanted and the precipitate washed by decantation until the liquid removed showed no reaction for chloride when tested with silver nitrate solution. The resulting basic zirconium sulphate was treated with 500 mls. water and 40 mls. ammonia solution D 0.80 and the hydrated zirconia produced washed with water until free from sulphate ion before igniting to 900° C. for 1 hour to produce anhydrous zirconia. Chemical analysis showed that virtually all the phosphorus added to the zirconium oxychloride solution had passed into the final zirconium oxide, which, when mixed with silica, ammonium metavanadate and sodium fluoride in the proportions indicated above and calcined at 950° C., yielded a mauve colour similar to that obtained in Example 1.

(3) *Incorporation of Arsenic in the Master Mix*

A master mix was prepared by kneading together 4.96 grammes silica, 0.36 gramme sodium fluoride, 0.609 gramme ammonium metavanadate, and a solution made by dissolving 0.066 gramme arsenious oxide in 0.5 ml. of 10% aqueous sodium hydroxide solution. The resulting paste was dried, reduced to a powder, mixed with 10 grammes zirconium oxid and calcined as described above. Again this resulted in a mauve colour. The proportion of arsenic in this case was 0.5% of the weight of zirconium oxide.

(4) Incoropration of Arsenic in the Zirconia

A sample of zirconia containing 0.4% of arsenic was prepared by the method described in Example 2, substituting for the sodium phosphate solution a solution of arsenic acid prepared by dissolving 0.21 gramme of arsenious oxide in 10 mls. of concentrated nitric acid evaporating almost to dryness and dissolving the residue in 150 mls. of water. The zirconia resulting from this treatment gave a mauve colour when heated with a master mix of silica, sodium fluoride and ammonium vanadate as in Example 3.

The following are examples illustrating the effect of the addition in the proportions stated of bismuth, alone or together with yttrium, lanthanum and neodymium, and manganese to a mixture of 10 gms. $ZrO_2$, 4.96 gms. $SiO_2$, 0.36 gm. NaF and 0.609 gm. $NH_4VO_3$. In each case the stain was made by grinding the constituent materials other than the zirconia to give a uniform mixture, then shaking up crystalline zirconia with the mix and finally calcining at 950° C. This temperature suffices to ensure complete conversion of the ingredients into a silicate but is not so high as to cause volatilisation of any of the metal constituents.

| | |
|---|---|
| 0.375 gm. $Bi_2O_3$ | Blue-green. |
| 0.65 gm. $Bi_2O_3$ | Green. |
| 0.89 gm. $Bi_2O_3$ | Yellow-green. |
| 2.3 gm. $Bi_2O_3$ | Pale yellow. |
| 0.56 gm. $Bi_2O_3$ and 0.2 gm. $Y_2O_3$ | Pale greeny yellow. |
| 0.56 gm. $Bi_2O_3$ and 0.3 gm. $Y_2O_3$ | Pale yellow. |
| 0.56 gm. $Bi_2O_3$ and 0.6 gm. $La_2O_3$ | Pale browny yellow. |
| 0.56 gm. $Bi_2O_3$ and 0.6 gm. $Nd_2O_3$ | Do. |
| 0.15 gm. $MnO_2$ | Sea green. |
| 0.25 gm. $MnO_2$ | Grey-green. |

The stains according to the invention may be incorporated in a glaze mixture as follows:

| | | |
|---|---|---|
| Frit (composition as below) | gms | 75 |
| Stain in accordance with any foregoing example | gms | 7.5 |
| China clay | gms | 3.75 |
| Water | mls | 75 |

This mixture was milled for 4 hours, sprayed on to a tile and fired at 1050° C.

Frit composition:

| | Percent |
|---|---|
| Potash feldspar | 46.9 |
| Flint | 14.6 |
| Whiting | 15.1 |
| Barium carbonate | 3.1 |
| Boric acid | 13.0 |
| Anhydrous borax | 4.7 |
| Kaolin | 2.6 |

What I claim as my invention and desire to secure by Letters Patent is:

1. A vanadium zirconium stain consisting of a zirconium silicate crystal lattice formed by calcination of a mixture of zirconia, silica, an alkali metal halide and a source of vanadium pentoxide, said stain including in the crystal lattice as a colour modifier an element selected from the group consisting of phosphorus, arsenic, manganese and bismuth in a proportion by weight of the zirconia in the stain of 0.1 to 1% in the case of phosphorus, 0.1–2% in the case of arsenic, 0.1–2% in the case of manganese and 0.5–25% in the case of bismuth.

2. A vanadium zirconium stain consisting of a zirconium silicate crystal lattice formed by calcination of a mixture of zirconia, silica, an alkali metal halide and a source of vanadium pentoxide, said stain including in the crystal lattice as a colour modifier bismuth in a proportion by weight of the zirconia of 0.5–15%.

3. A stain as claimed in claim 2, which contains in the zirconium silicate lattice as a further colour modifier yttrium in a proportion by weight of the zirconia of 0.1–3%.

4. A stain as claimed in claim 2, which contains in the zirconium silicate lattice as a further colour modifier lanthanum in a proportion by weight of the zirconia of 0.2–6%.

5. A stain as claimed in claim 2, which contains in the zirconium silicate lattice as a further colour modifier neodymium in a proportion by weight of the zirconia of 0.2–6%.

6. A stain as claimed in claim 1, which contains 0.2–0.3% of phosphorus.

7. A stain as claimed in claim 1, which contains 0.4–0.6% arsenic.

8. A method of preparing a vanadium zirconium stain which comprises admixing a water soluble phosphate with silica, ammonium metavanadate, sodium fluoride, and zirconia and calcining the mixture of said ingredients at a temperature sufficient to convert the ingredients completely into zirconium silicate but insufficient to volatilize metallic constituents of said ingredients, said mixture containing silica in a proportion of 48.8–50%, ammonium vanadate in a proportion of 3–15% and sodium fluoride in a proportion of 1.8–9%, all proportions being by weight of the zirconia, and sufficient water soluble phosphate to yield in the calcined product phopshorus in an amount of 0.1–1% of the weight of the zirconia.

9. A method of preparing a vanadium zirconium stain which comprises admixing arsenious acid with silica, ammonium metavanadate, sodium fluoride, and zirconia and calcining the mixture of said ingredients at a temperature sufficient to convert the ingredients completely into zirconium silicate but insufficient to volatilize metallic constituents of said ingredients, said mixture containing silica in a proportion of 48.8–50%, ammonium vanadate in a proportion of 3–15% and sodium fluoride in a proportion of 1.8–9%, all proportions being by weight of the zirconia, and sufficient arsenious acid to yield in the calcined product arsenic in an amount of 0.1–2% of the weight of the zirconia.

10. A method of preparing a vanadium zirconium stain which comprises admixing manganese dioxide with silica, ammonium metavanadate, sodium fluoride, and zirconia and calcining the mixture of said ingredients at a temperature sufficient to convert the ingredients completely into zirconium silicate but insufficient to volatilize metallic constituents of said ingredients, said mixture containing silica in a proportion of 48.8–50%, ammonium vanadate in a proportion of 3–15% and sodium fluoride in a proportion of 1.8–9%, all proportions being by weight of the zirconia, and sufficient manganese dioxide to yield in the calcined product manganese in an amount of 0.1–2% of the weight of the zirconia.

11. A method of preparing a vanadium zirconium stain which comprises admixing bismuth oxide with silica, ammonium metavanadate, sodium fluoride, and zirconia and calcining the mixture of said ingredients at a temperature sufficient to convert the ingredients completely into zirconium silicate but insufficient to volatilize metallic constituents of said ingredients, said mixture containing silica in a proportion of 48.8–50%, ammonium vanadate in a proportion of 3–15% and sodium fluoride in a proportion of 1.8–9%, all proportions being by weight of the zirconia, and sufficient bismuth oxide to yield in the calcined product bismuth in an amount of 0.5–25% of the weight of the zirconia.

12. A method of preparing a vanadium zirconium stain which comprises admixing bismuth oxide, yttrium oxide, silica, ammonium metavanadate, sodium fluoride, and zirconia and calcining the mixture of said ingredients at a temperature sufficient to convert the ingredients completely into zirconium silicate but insufficient to volatilize metallic constituents of said ingredients, said mixture containing silica in a proportion of 48.8–50%, ammonium vanadate in a proportion of 3–15% and sodium fluoride in a proportion of 1.8–9%, all proportions being by weight of the zirconia, and sufficient bismuth oxide and yttrium oxide to yield in the calcined product bismuth in an amount of 0.5–15% and yttrium in an amount of 0.1–3% of the weight of the zirconia.

13. A method of preparing a vanadium zirconium stain which comprises admixing bismuth oxide, lanthanum oxide, silica, ammonium metavanadate, sodium fluoride, and zirconia and calcining the mixture of said ingredients at a temperature sufficient to convert the ingredients completely into zirconium silicate but insufficient to volatilize metallic constituents of said ingredients, said mixture containing silica in a proportion of 48.8–50%, ammonium vanadate in a proportion of 3–15% and sodium fluoride in a proportion of 1.8–9%, all proportions being by weight of the zirconia, and sufficient bismuth oxide and lanthanum oxide to yield in the calcined product bismuth in an amount of 0.5–15% and lanthanum in an amount of 0.2–6% of the weight of zirconia.

14. A method of preparing a vanadium zirconium stain which comprises admixing bismuth oxide, neodymium oxide, silica, ammonium metavanadate, sodium fluoride, and zirconia and calcining the mixture of said ingredients at a temperature sufficient to convert the ingredients completely into zirconium silicate but insufficient to volatilize metallic constituents of said ingredients, said mixture containing silica in a proportion of 48.8–50%, ammonium vanadate in a proportion of 3–15% and sodium fluoride in a proportion of 1.8–9%, all proportions being by weight of the zirconia, and sufficient bismuth oxide and neodymium oxide to yield in the calcined product bismuth in an amount of 0.5–15% and neodymium in an amount of 0.2–6% of the weight of the zirconia.

15. A method of preparing a vanadium zirconium stain which comprises heating a mixture of solutions of sodium phosphate and zirconium oxychloride with sulphuric acid, treating zirconium sulphate precipitated by the reaction with ammonia to convert it into hydrated zirconia, igniting the hydrated zirconia to convert it into anhydrous zirconia, the amount of sodium phosphate in said mixture being such that said anhydrous zirconia contains 0.1–1% by weight of phosphorus, admixing said anhydrous zirconia with 48.8–50% by weight of silica, 3–15% by weight of ammonium vanadate and 1.8–9% by weight of sodium fluoride and calcining said admixture at a temperature sufficient to convert the ingredients completely into zirconium silicate but insufficient to volatilize metallic constituents of said ingredients.

16. A method of preparing a vanadium zirconium stain which comprises heating a mixture of solutions of arsenic acid and zirconium oxychloride with sulphuric acid, treating zirconium sulphate precipitated by the reaction with ammonia to convert it into hydrated zirconia, igniting the hydrated zirconia to convert it into anhydrous zirconia, the amount of arsenic acid in said mixture being such that said anhydrous zirconia contains 0.1–2% by weight of arsenic, admixing said anhydrous zirconia with 48.8–50% by weight of silica, 3–15% by weight of ammonium vanadate and 1.8–9% by weight of sodium fluoride and calcining said admixture at a temperature sufficient to convert the ingredients completely into zirconium silicate but insufficient to volatilize metallic constituents of said ingredients.

References Cited in the file of this patent

UNITED STATES PATENTS

| | | |
|---|---|---|
| 2,068,294 | Korinth et al. | Jan. 19, 1937 |
| 2,441,447 | Seabright | May 11, 1948 |
| 2,875,085 | Morris et al. | Feb. 24, 1959 |
| 2,875,086 | Weyl | Feb. 24, 1959 |
| 2,889,232 | Linnell | June 2, 1959 |
| 2,992,123 | Seabright | July 11, 1961 |
| 3,011,901 | Traub et al. | Dec. 5, 1961 |